United States Patent [19]

Tattermusch

[11] 4,202,563

[45] May 13, 1980

[54] INDEPENDENT WHEEL SUSPENSION FOR MOTOR VEHICLES, ESPECIALLY FOR PASSENGER MOTOR VEHICLES

[75] Inventor: Peter Tattermusch, Esslingen, Fed. Rep. of Germany

[73] Assignee: Daimler-Benz Aktiengesellschaft, Fed. Rep. of Germany

[21] Appl. No.: 836,614

[22] Filed: Sep. 26, 1977

[30] Foreign Application Priority Data

Sep. 24, 1976 [DE] Fed. Rep. of Germany ....... 2642939

[51] Int. Cl.² .............................................. B62D 7/20
[52] U.S. Cl. ..................................... 280/675; 280/665
[58] Field of Search ............... 280/663, 665, 666, 670, 280/675, 696, 690; 267/20 A

[56] References Cited

U.S. PATENT DOCUMENTS

| 3,278,196 | 10/1966 | Van Winsen | 280/665 |
| 3,831,970 | 8/1974 | Müller | 280/665 X |
| 3,881,741 | 5/1975 | Müller | 280/675 |

FOREIGN PATENT DOCUMENTS

6909303 12/1969 France ...................................... 280/666

*Primary Examiner*—Stephen G. Kunin
*Assistant Examiner*—Terrance L. Siemens
*Attorney, Agent, or Firm*—Craig & Antonelli

[57] ABSTRACT

An independent wheel suspension for motor vehicles is provided, especially for passenger motor vehicles with a wheel carrier which is pivotally connected at an upper guide member and at a lower guide member and which has a fixed pivot axis with respect to one of the two guide members. This fixed pivot axis is determined by the point of pivotal connection of the wheel carrier at the one guide member and a point of pivotal connection of a coupler at the one guide member, whereby the coupler together with a rod pivotally connected on the side of the body forms the other guide member; the second one of the points of pivotal connection of the wheel carrier at the guide members which determine the steering axis, is thereby coordinated to the two guide members.

53 Claims, 12 Drawing Figures

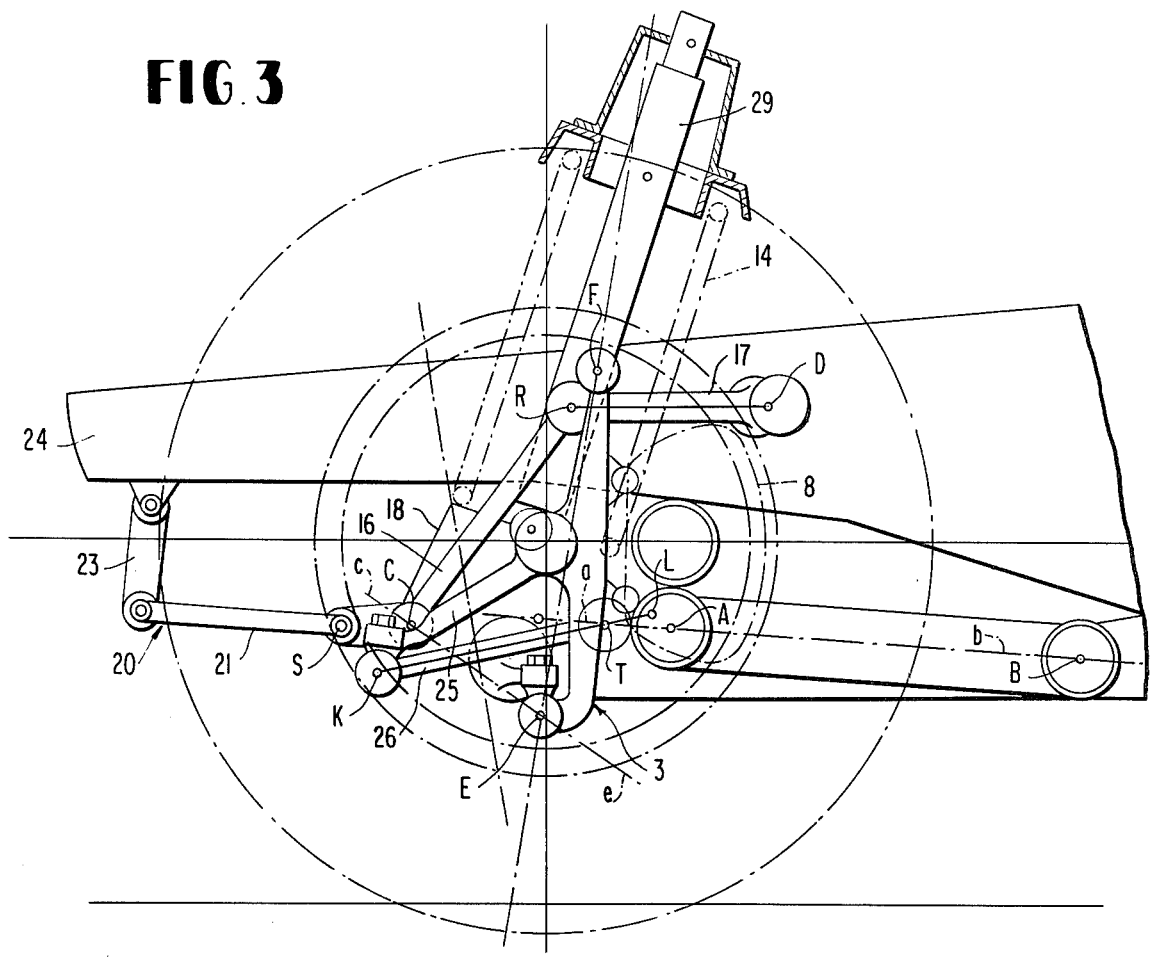
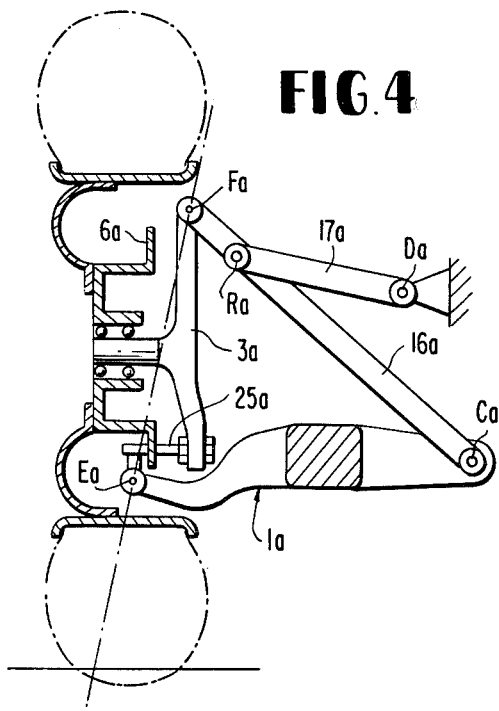
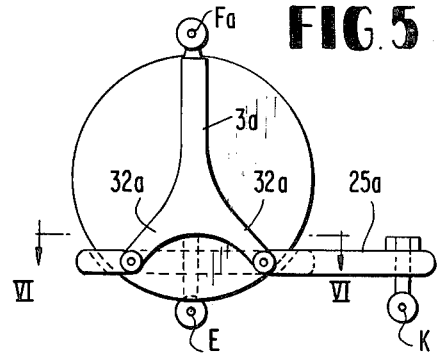
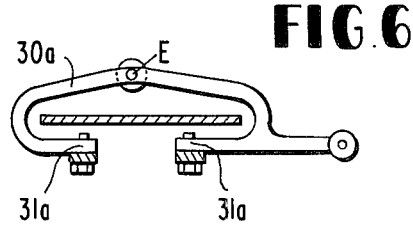

INDEPENDENT WHEEL SUSPENSION FOR MOTOR VEHICLES, ESPECIALLY FOR PASSENGER MOTOR VEHICLES

The present invention relates to an independent wheel suspension for motor vehicles, especially for passenger motor vehicles with a wheel carrier, which is pivotally connected at an upper and at a lower wheel guide member and which has a fixed pivot axis with respect to one of the guide members.

The present invention is concerned with the task to further develop such a wheel suspension with a view toward the smallest possible installation space and the greatest possible modification possibilities and utility, especially for use with front axle wheels.

This is achieved according to the present invention with an independent wheel suspension of the aforementioned type in that the pivot axis which is fixed with respect to the one wheel guide member, is determined by the point of pivotal connection of the wheel carrier and a point of pivotal connection of a coupler which, together with a strut or rod pivotally connected on the body side forms the other wheel guide member, to which is coordinated the second of the points of pivotal connection of the wheel carrier at the wheel guide member, which determine the steering axis.

The construction according to the present invention enables with a comparatively small structural space, large support bases for the guide members. It further enables a far-reaching independence of the camber change over the spring path from guide member lengths. It finally provides good possibilities as regards the selection of the respectively desired steering roll radius, enables large negative steering roll radii and offers with customary wheel dish configurations possibilities for the accommodation of both floating caliper brakes and fixed caliper brakes.

In one embodiment of the present invention, the pivotal connection of the wheel carrier may take place at the coupler or strut, from which result numerous control possibilities, i.e., numerous possibilities of variations in the kinematic design and construction. It is particularly appropriate within the scope of the present invention to coordinate the point of pivotal connection of the coupler to the lower wheel guide member, i.e., to form the upper guide member by the coupler and the strut or rod.

Especially with such a construction, it has proved advantageous if the guide member connected with the coupler, i.e., the lower guide member is directed toward the rear in relation to the vehicle longitudinal direction, and more particularly in one embodiment an inclined guide member with a pivot axis extending in plan view obliquely from the rear and outside forwardly toward the inside. Especially such a construction provides the possibility of the support of the axle as far to the rear of the center of the wheel as possible as well as also the possibility for the realization of a toe-in of $\geq 0$ with longitudinal tension, i.e., in the presence of a longitudinal tensional force replacing the brake force during static tests of the axle, and more particularly by displacement of the inclined guide member toward the outside under the influence of the brake force. The latter is of advantage especially with front axles, in which the layout within the scope of the solution according to the present invention of the steering kinematics if no longer impaired or precluded by the spacing of possible extended or aligned positions in the steering linkage in which parts of the steering linkage extend substantially in a straight line. Instead, an optimization of the transmission or translation in the steering linkage is possible to the effect that no increase of the steering wheel forces occur with larger wheel deflections.

The wheel suspension according to the present invention enables especially also transmission or translation ratios for the spring and torsion rod stabilizer of the order of magnitude of 1 and more particularly without the necessity of the support directly at the wheel carrier.

A large wheel deflection angle can be realized thereby for front wheel suspensions notwithstanding a very wide support base, in which the outer point of pivotal connection on the side of the body is located approximately in the wheel plane and the inner point of pivotal connection on the side of the body is located approximately within the area of the vehicle longitudinal center plane, with a preferred construction of the lower guide member as an inclined guide member and with the extension of the pivot axis thereof obliquely from the rear and outside forwardly toward the inside under a relatively flat angle, the inclined guide member includes essentially a base portion coordinated to the pivot axis, with respect to which a branch extends approximately perpendicularly displaced toward the forward inner point of pivotal connection, at the end of which are supported the spring and stabilizer, preferably disposed in front of the wheel center plane, and from which a branch holding the lower point of pivotal connection of the wheel carrier starts that extends approximately in the vehicle transverse direction.

With such a construction, the inclined guide member leaves sufficient free space for large wheel deflection angles, especially if the coupler, starting from the upper point of pivotal connection of the wheel carrier, is pivotally connected essentially transversely directed at the inclined guide member within the area of the spring support and if the rod is formed as a tension rod which extends far-reachingly parallel to the branch of the forwardly projecting inclined guide member, engages at the coupler near the upper point of pivotal connection of the wheel carrier and is pivotally connected on the side of the body above the inclined guide member.

Accordingly, it is an object of the present invention to provide an independent wheel suspension for motor vehicles, especially for passenger motor vehicles, which avoids by simple means disadvantage encountered in the prior art.

Another object of the present invention resides in an independent wheel suspension for motor vehicles, especially for passenger motor vehicles, which requires a relatively very small space for its installation and offers numerous possibilities as regards its application and possible modifications in such applications.

A further object of the present invention resides in an independent wheel suspension for motor vehicles which enables a large support base for the guide members without requiring a large space for its installation.

Another object of the present invention resides in an independent wheel suspension of the type described above which enables a far-reaching independence of the camber change as a function of the spring path movement of the wheel carrier due to the guide member lengths.

Still another object of the present invention resides in an independent wheel suspension which achieves all of the aforementioned aims and objects by simple means, yet permits a selection of a desired steering roll radius, particularly also of large negative steering roll radii.

A further object of the present invention resides in an independent wheel suspension in which the translation in the steering linkage can be optimized to preclude large increases in the steering forces even with large wheel deflections.

These and other objects, features and advantages of the present invention will become more apparent from the following description when taken in connection with the accompanying drawing which shows, for purposes of illustration only, several embodiments in accordance with the present invention, and wherein:

FIG. 3 is a schematic side elevational view of the front wheel suspension according to FIG. 1;

FIG. 4 is a schematic rear elevational view of a modified embodiment of a front wheel suspension according to FIG. 1, in which the lower guide member is constructed as an inclined guide member and is pivotally connected at the wheel carrier by way of the steering arm or drag link as intermediate member;

FIG. 5 is a simplified schematic side elevational view of the front wheel suspension according to FIG. 4;

FIG. 6 is a partial cross-sectional view, taken along line VI—VI of FIG. 5;

Figure 2:
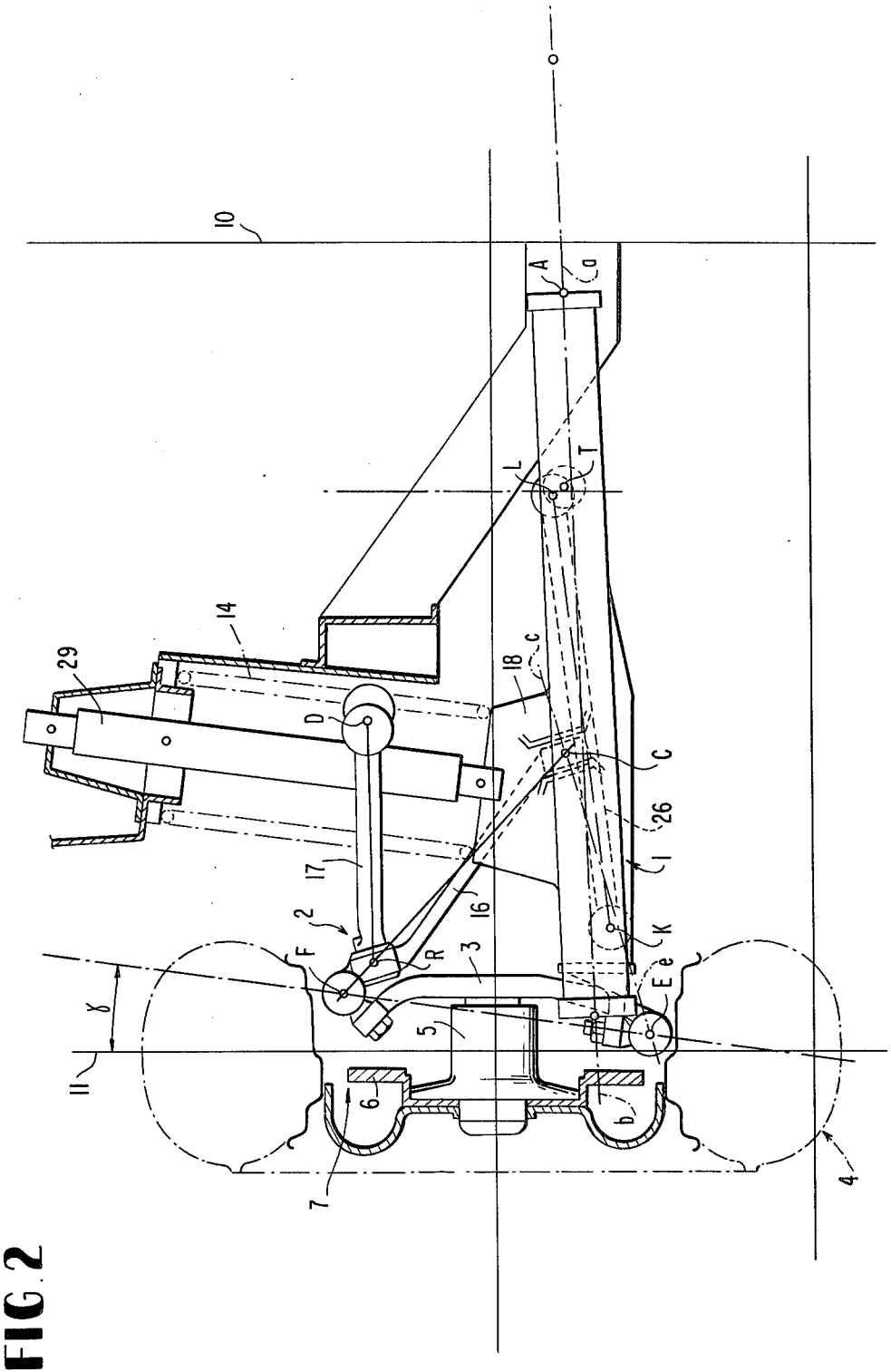
FIG. 2 is a schematic rear elevational view of the front wheel suspension according to FIG. 1.
Figure 7:
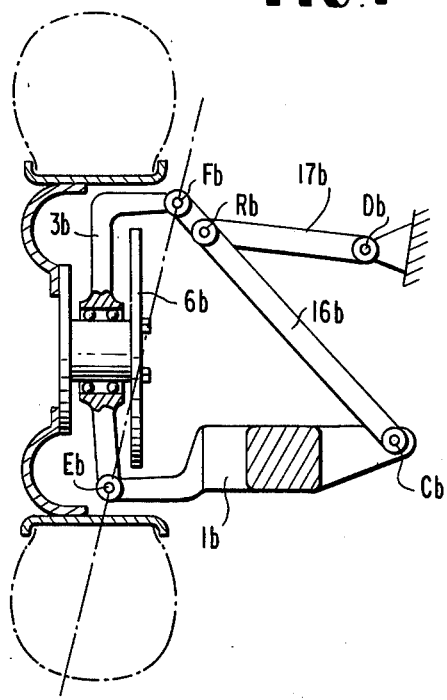
FIG. 7 is a schematic rear elevational view of another modified embodiment of a wheel suspension according to the present invention, in which the brake disk is arranged inside of the wheel carrier and the wheel carrier is constructed projecting radially inwardly over the brake disk.
Figure 8:
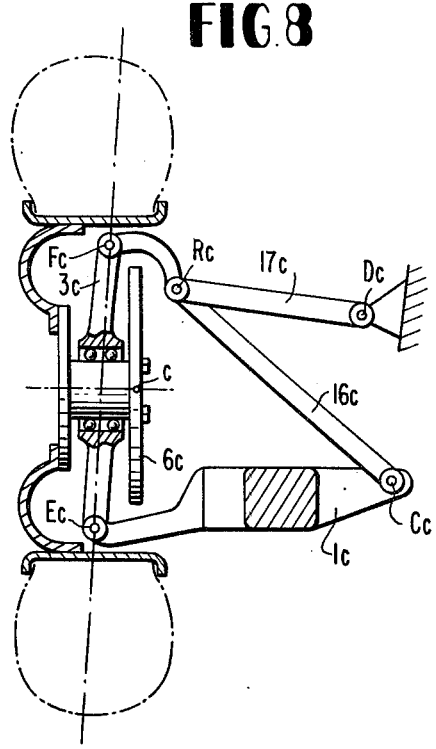
FIG. 8 is a schematic rear elevational view, similar to FIG. 7, of a further modified embodiment of a wheel suspension in accordance with the present invention which corresponds to the arrangement of FIG. 7 as regards the location of the brake disk relative to the wheel carrier, but in which the coupler pivotally connected at the wheel carrier extends over the brake disk.
Figure 9:
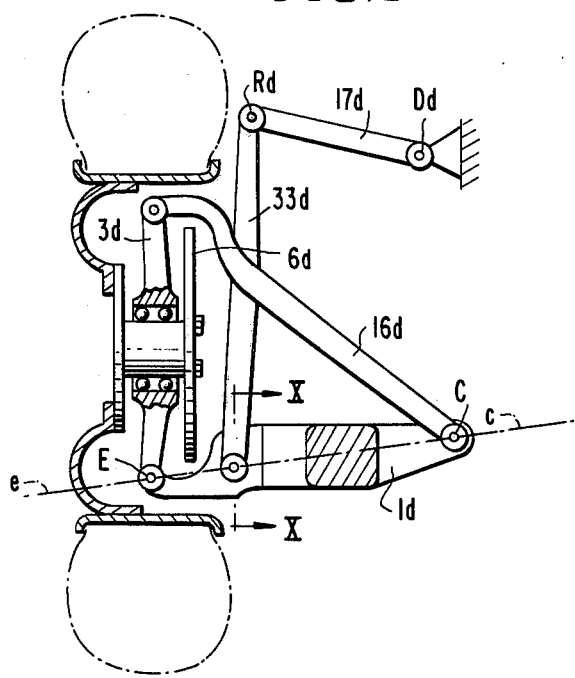
Figure 10:
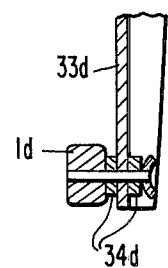
Figure 11:
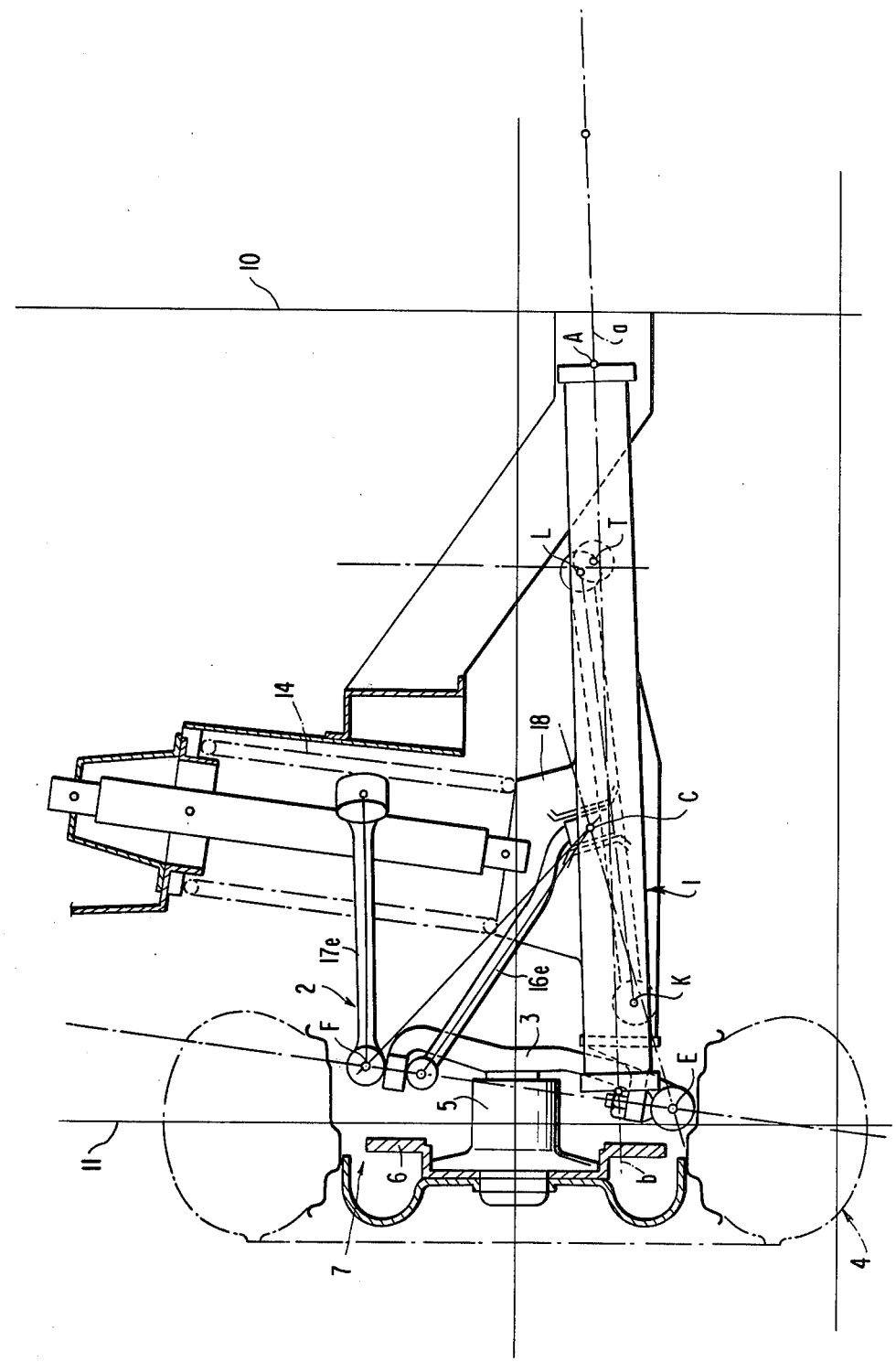
Figure 12:
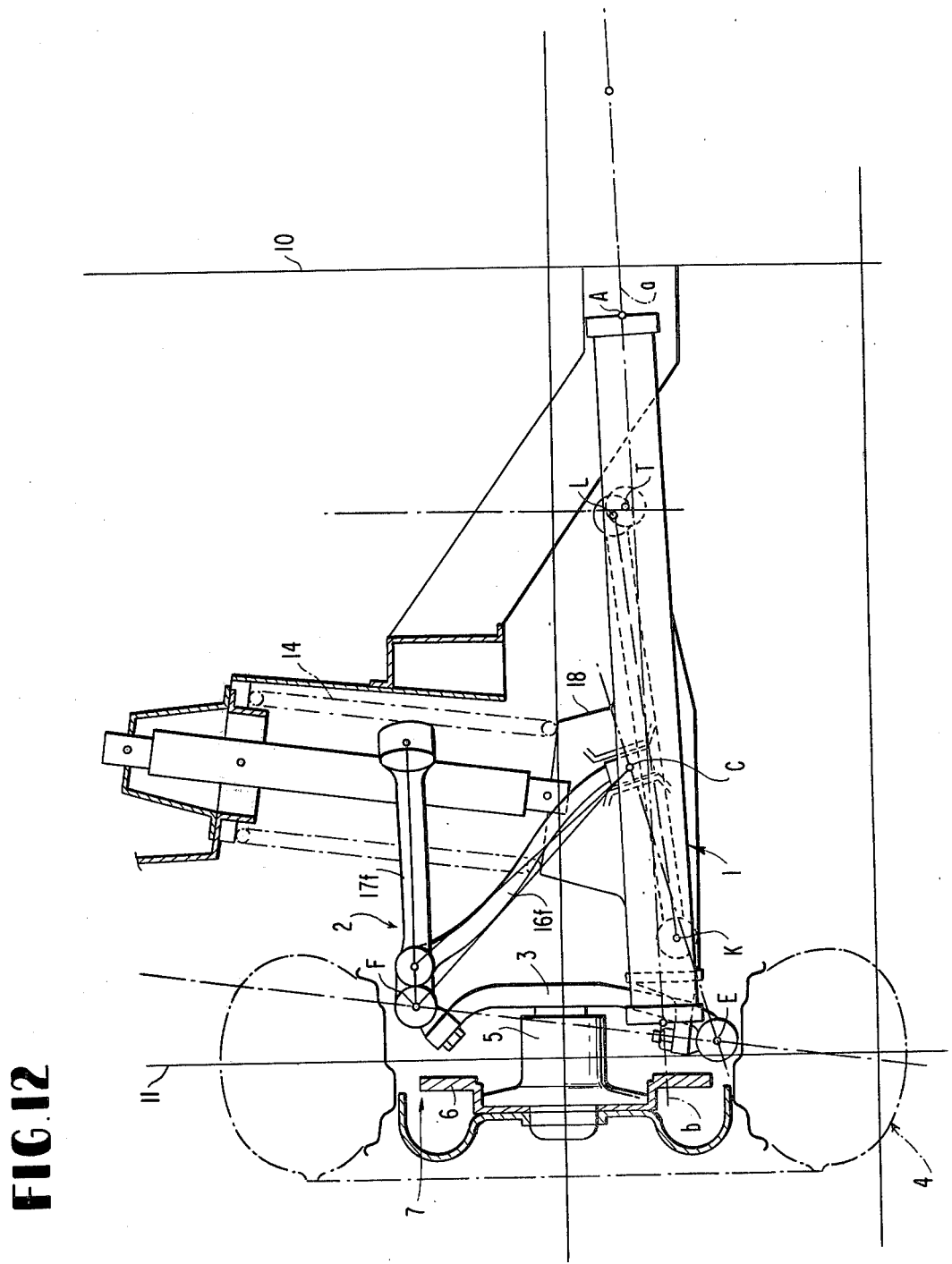

FIG. 9 is a schematic rear elevational view of a still further modified embodiment of an independent wheel suspension according to the present invention which is similar to the arrangement of FIGS. 7 and 8 as regards the location of the wheel carrier and brake disk, but in which the coupler extends over the brake disk and includes a point of pivotal connection for the tension rod or strut offset with respect to the line of connection of the points of pivotal connection of the coupler at the wheel carrier and at the inclined guide member;

FIG. 10 is a partial cross-sectional view taken along line X—X of FIG. 9;

FIG. 11 is a schematic rear elevational view, similar to FIG. 2, of a further modified embodiment of an independent wheel suspension according to the present invention, in which the rod and the coupler are pivotally connected at the wheel carrier; and FIG. 12 is a schematic rear elevational view of a still further modified embodiment of an independent wheel suspension according to the present invention, similar to FIG. 2, in which the coupler is pivotally connected at the rod.

Figure 1:
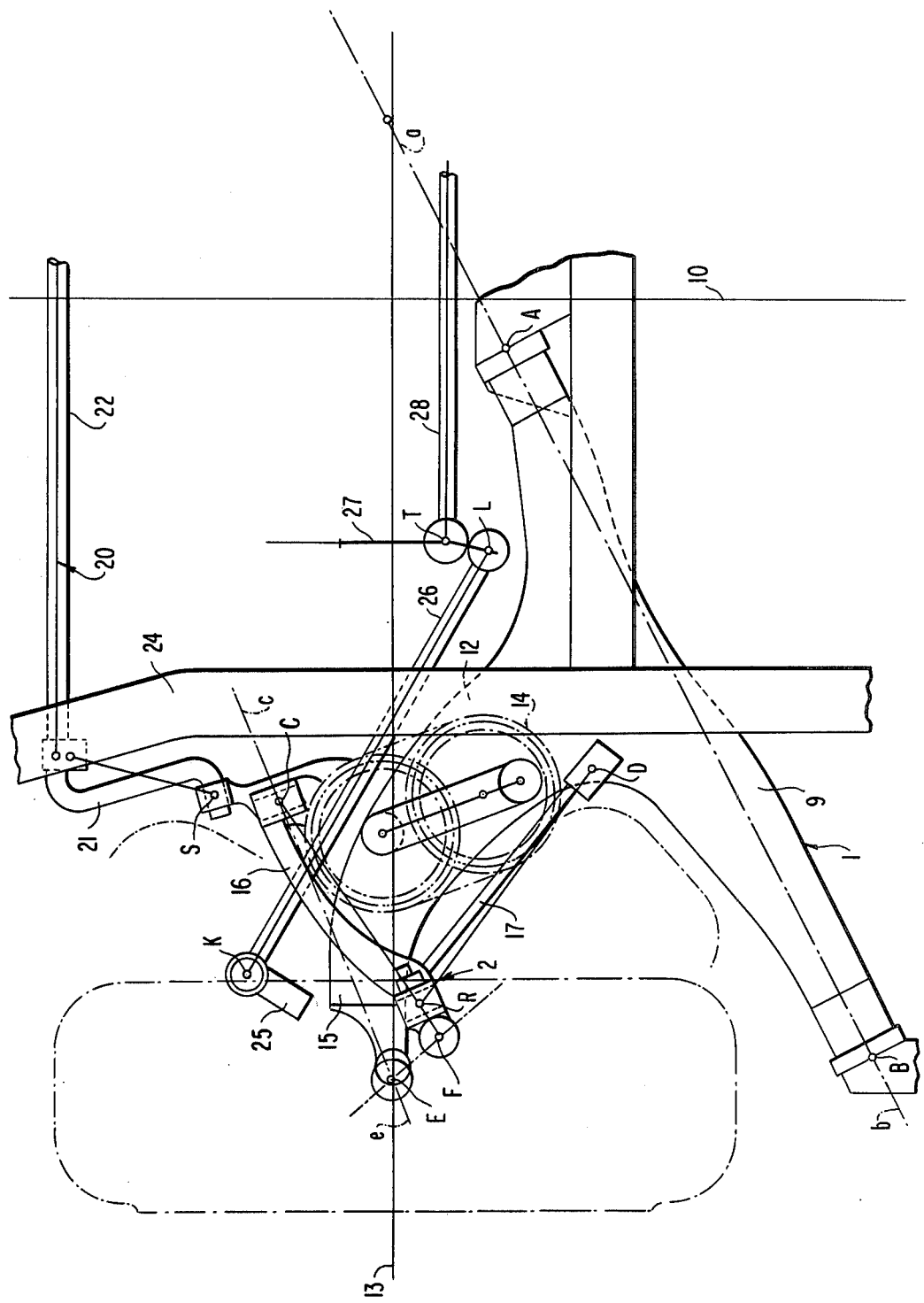
FIG. 1 is a schematic plan view of a wheel suspension in accordance with the present invention in one embodiment of its construction as front wheel suspension.

Referring now to the drawing wherein like reference numerals are used throughout the various views to designate like parts, and more particularly to FIGS. 1 to 3, an independent wheel suspension according to the present invention for a front axle is illustrated partially schematically and simplified in these figures, which includes a lower wheel guide member generally designated by reference numeral 1 and an upper wheel guide member generally designated by reference numeral 2. The guide members 1 and 2 carry in points of pivotal connection E and F coordinated thereto the wheel carrier 3, on which the wheel 4 is rotatably mounted in the customary manner, as shown in particular in FIG. 2. In the illustrated embodiment the wheel carrier 3 and the wheel pin coordinated thereto, which is not illustrated in detail herein, and the wheel hub 5 extending over the wheel pin, with which the brake disk 6 is non-rotatably connected, are located inside of the wheel dish 7 (FIG. 2). This location of the wheel carrier 3 and of its points of pivotal connection E and F together with the brake disk 6 and the brake caliper 8 (FIG. 3) inside of the wheel dish 7 is possible by reason of the fact that in the wheel suspension according to the present invention only very small relative movements occur during spring deflections between the wheel carrier 3 and the lower guide member 1 and the upper guide member 2. The indicated location of the points of pivotal connection E and F also makes it possible in a simple manner to realize negative steering roll radii with a small inclination of the steering axis, in the illustrated embodiment, with a steering axis angle angle $\gamma$ of approximately 7°, as can be seen from FIG. 2.

The lower guide member 1 is constructed in the embodiment according to the present invention illustrated in FIGS. 1 to 3 by an inclined guide member whose pivot axis a–b extends in plan view (FIG. 1) at an angle of about 27° obliquely from the rear and outside forwardly toward the inside. In rear view (FIG. 2), the pivot axis a–b is inclined under an angle of about 3° to the horizontal and extends rising from the outside toward the inside. In side view (FIG. 3), the inclination of the pivot axis a–b amounts to about 5° with respect to the horizontal, whereby it rises from the rear toward the front.

The inclined guide member provided as lower guide member 1 includes a base portion 9 (FIG. 1) extending essentially parallel to the pivot axis a–b, which corresponding to the location of the points of pivotal connection A–B, extends over nearly half the width of the vehicle since the point of pivotal connection a is located near the vehicle longitudinal center line 10 whereas the point of pivotal connection b coincides nearly with the center plane 11 (FIG. 2) of the wheel 4.

The inclined guide member includes a branch 12 (FIG. 1) projecting forwardly from the base portion 9 which, in rough approximation, extends perpendicularly to the pivot axis a–b, whereby the support spring 14 (FIGS. 1–3) constructed in the illustrated embodiment as coil spring is supported on the lower inclined guide member 1 at the forward end of the branch 12 near the cross center plane 13 (FIG. 1) of the wheel 4. In the illustrated embodiment, the support point of the spring 14 on the branch 12 is located in front of the cross center plane 13 and a spring transmission or translation ratio of nearly 1 results by reason of the spacing of the support point of the spring 14 on the guide member 1 with respect to the pivot axis a–b.

The lower guide member 1 includes a further branch portion 15 extending in the outward direction transversely to and adjoining the branch 12 so that a base shape results for the lower guide member approximating in plan view the shape of a U or similar to the numeral 1, which enables large wheel steering angles since the branch 12 in its bifurcation from the base portion 9 is located nearer the point of pivotal connection A than the point of pivotal connection B.

The upper guide member 2 includes in the illustrated embodiment a coupler 16 and a tension strut or rod 17. The coupler 16 is thereby pivotally connected at the wheel carrier 3 in the point of pivotal connection F which in the illustration according to FIG. 1 is shown only schematically, and it extends from this point of pivotal connection F obliquely forwardly and downwardly, whereby it is pivotally connected at the lower guide member 1 in the point of pivotal connection C which in the illustrated embodiment is located within the area in front of the cross center plane 13 of the wheel 4 (FIG. 1). Concretely, the point C lies in the illustration according to FIGS. 1 to 3, as can be seen in particular from FIG. 1, in front of the spring seat 18 carrying the spring 14 and provided on the lower guide member 1. In relation to the connecting line of the points of pivotal connection F and C, the coupler 16 thereby has in plan view (FIG. 1) an inclination of about 35° with respect to the vehicle cross plane, whereby it extends obliquely forwardly and inwardly from the point F toward the point C. In rear view according to FIG. 2, the coupler 16 is inclined at an angle of about 43° to the horizontal, whereby it extends from the point of pivotal connection C to the point of pivotal connection F obliquely from the inside and below upwardly toward the outside. In the side view according to FIG. 3, the coupler 16 has an inclination of about 35° with respect to the vertical whereby it extends from the point of pivotal connection C to the point of pivotal connection F obliquely from in front and below upwardly toward the rear. A location for the point of pivotal connection C below the wheel center (FIG. 2) and in front of the cross center plane 13 (FIG. 3) results from this location of the coupler 16, which conditions for the plane C-E-F determined by the points of pivotal connection of the coupler 16 and the points of pivotal connection of the wheel carrier 3 in plan view a pivot axis c-e with respect to the lower wheel guide member 1 which extends in plan view (FIG. 1) under an angle of about 22° to the cross center plane 13 obliquely from the rear and outside forwardly toward the inside. In rear view (FIG. 2), the axis c-e is inclined at an angle of about 16° with respect to the horizontal and extends from below and outside (point E) obliquely upwardly toward the inside (point C). In side view (FIG. 3), the axis c-e has an inclination of about 35° with respect to the horizontal and extends from the rear and below (point E) obliquely upwardly toward the front (point C).

The tension strut or tie rod 17 is pivotally connected at the coupler 16, and more particularly in the point of pivotal connection R. The point of pivotal connection of the tension strut or tie rod 17 on the side of the body is designated by reference character D and is located to the rear of the coupler 16 in relation to the vehicle longitudinal direction (side view according to FIG. 3). The tie rod 17 extends in plan view according to FIG. 1 under an angle of about 36° to the cross center plane 13, and more particularly from in front and outside obliquely rearwardly toward the inside. The extension of the tie rod 17 is thereby approximately horizontal in the normal position, as is shown in side view according to FIG. 3 and rear view according to FIG. 2.

In the illustrated embodiment, the stabilizer generally designated by reference numeral 20 which is U-shaped in plan view (FIG. 1), is pivotally connected at the guide member 1 in the point S near the point of pivotal connection C of the coupler 16 at the guide member 1, as shown in FIGS. 1 and 3, by way of its respective stabilizer arm 21. The stabilizer 20 is thereby disposed in its normal position, as viewed overall, approximately in a horizontal plane which corresponds in its height location to the point of pivotal connection C. By reason of the fact that the point of pivotal connection S of the stabilizer 20 at the guide member 1 is located far from the pivot axis a–b thereof, a very good translation ratio results therefrom. Within the area of its base 22 (FIG. 1), the stabilizer 20 is attached on the side of the body by way of shackles or links 23 (FIG. 3), in the illustrated case at the longitudinal bearers 24, of which, as also of the wheel suspension and the steering system, only the parts coordinated to one vehicle side are shown by reason of the symmetric construction of the vehicle. The connection of the shackles 23 with the longitudinal bearer 24 and with the base 22 of the stabilizer 20 takes place in a conventional manner by way of elastic bearing supports, especially in the form of rubber bushes.

It can be seen in particular from FIG. 3 that a steering arm or drag link 25 is coordinated to the wheel carrier 3, which as viewed in side view according to FIG. 3, extends from the wheel center approximately obliquely forwardly and downwardly. The steering arm 25 is connected with the track rod or tie bar 26 in the point of pivotal connection K which in turn is pivotally connected at the steering gear arm 27 in the point of pivotal connection L. The connection of the steering gear arm 27—the steering gear of conventional construction is not illustrated in detail—to the intermediate steering lever belonging to the other vehicle side and correspondingly arranged and supported and therefore not illustrated herein, takes place by way of a steering rod 28. The steering gear arm 27, and also the intermediate steering lever (not shown) point opposite the driving direction and are connected with the steering rod 28 in point T. The steering arrangement according to the present invention completes the wheel suspension according to the present invention especially as regards the attainment of favorable steering transmission or translation ratios also with large wheel deflections since large spacings to the respective aligned position of the steering linkage parts still exist also with extreme deflections. In the normal position, large angles are correspondingly provided, whereby the angle between track rod 26 and steering arm 25 amounts to about 90° and between the steering gear lever 27 extending in the driving direction and the track rod 26 amounts to about 60°.

FIG. 3 illustrates that the point of pivotal connection K between the steering arm 25 and the track rod or tie bar 26 is located in side view slightly ahead and below the point of pivotal connection C of the coupler 16 at the guide member 1 so that, as seen overall, it is located practically adjacent the wheel dish circumference approximately in the inner boundary plane of the wheel. The tie rod 26 extends under an inclination of about 13° from below and in front upwardly toward the rear, as seen in side view according to FIG. 3, and it thereby connects the points of pivotal connection K–L. In plan view (FIG. 1), the tie rod 26 has in the illustrated embodiment an angle of about 30° to the cross center plane 13, and it thereby extends from the inside (point L) obliquely forwardly toward the outside (point K). In rear view according to FIG. 2, the tie rod 26 is inclined under an angle of about 8°, whereby the point of pivotal connection K is lower than the point of pivotal connection L.

The spring 14 which is supported on the lower guide member 1 by way of the spring seat 18, encloses the shock absorber 29 which is arranged coaxially inside of the spring 14. The inclination of the shock absorber 29 and of the spring axis with respect to the vertical amounts for the illustrated embodiment in side view according to FIG. 3 to approximately 17° and in rear view according to FIG. 2 approximately to 7° whereby the spring axis extends in side view obliquely from the rear and top forwardly and downwardly. In rear view (FIG. 3), the spring 14, as viewed from below toward the top, is slightly inclined toward the inside. In plan view according to FIG. 1, the spring axis has an angle of about 20° to the vehicle cross plane, and it extends thereby from the rear and the inside forwardly toward the outside.

FIG. 3 thereby illustrates that in side view the inclination of the spring axis is larger than the inclination of the steering axis which is inclined with respect to the vertical under an angle of about 9°. The point of pivotal connection E of the lower guide member 1 at the wheel carrier 3 is thereby located practically in the vertical cross center plane 13 of the wheel whereas the point of pivotal connection F of the wheel carrier 3 is slightly offset toward the rear with respect to the upper guide member 2. Both points of pivotal connection E and F of the wheel carrier 3 are further located in the illustrated embodiment within the wheel dish, whereby the point of pivotal connection E is located nearly in the center plane of the wheel 4.

In the following figures, further embodiments of the independent wheel suspension according to the present invention are illustrated whereby, for the same parts, corresponding reference numerals characterized by a respective suffix are used.

The embodiment of the wheel suspension according to the present invention illustrated in FIGS. 4 to 6, which is shown only very schematically, differs from that according to FIGS. 1 to 3 in principle only in that in this embodiment the lower point of pivotal connection $E_a$ of the wheel carrier 3a at the lower guide member 1a does not directly represent the connection between the wheel carrier 3a and the guide member 1a but instead that this point of pivotal connection $E_a$ is coordinated to the steering arm 25a which in its turn, is rigidly connected with the wheel carrier 3a. The steering arm 25a is for that purpose combined with a connecting element 30a in the form of an oval ring cut open along one longitudinal side, as illustrated in particular in FIGS. 5 and 6, whose two free leg ends 31a are rigidly connected with corresponding leg ends 32a of the wheel carrier 3a which is forked in its lower area.

A relatively simple, substantially plane construction of the wheel carrier is possible as a result thereof, and the point of pivotal connection $E_a$ between this wheel carrier 3a and the lower guide member 1a can nonetheless be so located that the brake disk 6a (FIG. 4) is located between this point of pivotal connection $E_a$ and the wheel carrier 3a. The brake disk 6a thereby extends within the area of the point of pivotal connection $E_a$ at the height of the lower guide member 1a into the oval of the ring 30a, which practically surrounds the brake disk 6a. Such a construction optimizes the number of construction possibilities that can be used with the wheel suspension.

As regards FIG. 4, as well as regards the further following figures, it should also be pointed out that the tension strut or tie rod 17a or 17b or 17c or 17d, in contrast to the schematic showing illustrated herein, extends essentially transversely to the plane which is defined by the respective points of pivotal connection between the coupler, wheel carrier and the lower guide member, so that it extends essentially corresponding to that which can be seen from FIG. 1, obliquely inwardly toward the rear.

Whereas in the preceding embodiments the brake disk is located in the customary manner in the wheel dish outside of the wheel carrier, embodiments are illustrated in FIGS. 7 to 10 which show a reverse arrangement, i.e., in which the brake disk is not offset toward the outside with respect to the wheel carrier but instead is offset toward the inside. In the embodiments according to FIGS. 7 and 8, the wheel carriers are thereby designated by reference numerals 3b and 3c and the brake disks by reference numerals 6b and 6c. Correspondingly, the reference numerals for the coupler are 16b and 16c and for the lower guide members are 1b and 1c. The points of pivotal connection of the wheel suspension which can be seen from the aforementioned FIGS. 7 and 8, are analogously designated by suffixes b and c.

In the embodiment according to FIG. 7, the wheel carrier 3b is cranked or offset at its upper end toward the inside over the brake disk 6b and the point of pivotal connection $F_b$ between the wheel carrier 3b and the coupler 16d is located offset toward the inside with respect to the brake disk 6b. A wheel suspension with a large king pin angle is made possible thereby.

In the embodiment according to FIG. 8, the point of pivotal connection $F_c$, in contrast to the embodiment according to FIG. 7, is offset toward the outside with respect to the brake disk 6c, whence a construction with small king pin angle and with a corresponding small offset of the steering axis with respect to the wheel center point will result. Nonetheless, a negative steering roll radius can be realized. Such an embodiment would be appropriate especially for driven front wheel suspensions.

Notwithstanding the overlap over the brake disk, both below as also above, sufficiently large brake disk diameters can be realized in the construction according to the present invention since the wheel carrier, and therewith also the wheel carries out practically no movements with respect to the coupler and the lower guide member, whence only very small clearances must exist between the wheel rim and the aforementioned wheel guide members.

A further embodiment of a wheel suspension according to the present invention will be described by reference to FIGS. 9 and 10, whereby analogous reference numerals with the suffix d are used. The wheel suspension illustrated by reference to FIGS. 9 and 10, which in relation to the arrangement of the brake disk 6d corresponds to that of FIGS. 7 and 8, is further developed to the effect that the forces introduced into the body by way of the tension strut or tie rod 16d, in lieu of which, of course, also a compression rod or strut may be used within the scope of the present ivention, can be kept as small as possible. For that purpose, provision is made in the embodiment according to FIGS. 9 and 10 to arrange the point of pivotal connection $R_d$ with respect to the pivot axis c–e, about which the wheel carrier 3d pivots together with the coupler 16d, at a larger distance than is the case in the preceding embodiments, in which the tie rod or strut 17d engages at the coupler essentially in the connecting line of the points of pivotal connection C and F.

This is achieved in the embodiment according to FIGS. 9 and 10 in that a cross member 33d is coordinated to the coupler 16d, which with a rigid connection with the coupler 16d is pivotally connected, on the one hand, at the lower guide member 1d, and more particularly preferably in the axis c–e, and, on the other hand, at a distance to the coupler 16d at the tie rod 17d in the point $R_d$. Since the point $R_d$ has a larger distance to the axis c–e, smaller support forces will result in the point $D_d$.

The connection of the cross member 33d with the guide member 1d is illustrated in FIG. 10 only as an example and can be ensured in a simple manner in that a pin is provided transversely to the axis c–e at the guide member 1d by way of which the cross member 33d is stressed under interposition of elastic buffers or cushions 34d.

FIG. 11 schematically illustrates an independent wheel suspension similar to that shown in FIG. 2, and therewith also to FIGS. 1 and 3, except that the strut or rod 17e as also the coupler 16e are pivotally connected at the wheel carrier 3 whereas, in FIG. 2, the strut 17 is pivotally connected at the coupler 16.

FIG. 12 illustrates an embodiment similar to FIG. 2 and therewith also to FIGS. 1 and 3, except that the coupler 16f is pivotally connected at the strut or rod 17f. As to the rest, FIGS. 11 and 12 are similar to FIGS. 1–3.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An independent wheel suspension for suspending a vehicle wheel at a frame of a motor vehicle, comprising:
   a wheel carrier means for rotatably supporting a vehicle wheel,
   first and second wheel guide means for guidingly connecting the wheel carrier means to the frame, said second wheel guide means including a coupler means and a rod means, said rod means being pivotably connected to the frame,
   said wheel carrier means being pivotably connected to both of said wheel guide means and having a fixed pivot axis with respect to said first wheel guide means, said fixed pivot axis being determined by a first pivotal connection point at the wheel carrier means and the first guide means and a second pivotal connection point at the coupler means and the first guide means.

2. An independent wheel suspension according to claim 1, characterized in that the suspension is for steered wheels.

3. An independent wheel suspension according to claim 1, characterized in that the coupler means is pivotally connected at the wheel carrier means.

4. An independent wheel suspension according to claim 1, characterized in that the rod means is pivotally connected at the wheel carrier means.

5. An independent wheel suspension according to claim 1, characterized in that the coupler means is pivotally connected at the rod means.

6. An independent wheel suspension according to claim 1, characterized in that said first guide means is provided as a lower guide member.

7. An independent wheel suspension according to claim 1, characterized in that said coupler means is operatively connected with said first wheel guide means at its end opposite its connection with said rod means.

8. An independent wheel suspension according to claim 7, characterized in that said first guide means is directed rearwardly in relation to the vehicle longitudinal direction.

9. An independent wheel suspension according to claim 8, characterized in that said first guide means is constructed as triangular guide member.

10. An independent wheel suspension according to claim 9, characterized in that the triangular guide member is constructed as an oblique guide member.

11. An independent wheel suspension according to claim 10, characterized in that said first guide means is provided as a lower guide member.

12. An independent wheel suspension according to claim 10, characterized in that the outer point of pivotal connection on the side of the body of the triangular guide member is located approximately in the wheel longitudinal center plane.

13. An independent wheel suspension according to claim 12, characterized in that the inner point of pivotal connection on the side of the body of the triangular guide member is located within the area of the vehicle longitudinal center plane.

14. An independent wheel suspension according to claim 13, characterized in that the point of pivotal connection of the coupler means at the triangular guide member is located outside of the triangle delimited in plan view by the points of pivotal connection thereof.

15. An independent wheel suspension according to claim 14, with a spring means, characterized in that the support of the spring means at the triangular guide member is located in plan view outside of the triangle delimited by the points of pivotal connection thereof.

16. An independent wheel suspension according to claim 15, characterized in that the point of pivotal connection of the coupler means at the one guide means is located in front of the cross plane containing the wheel center in relation to the vehicle longitudinal direction.

17. An independent wheel suspension according to claim 16, characterized in that the coupler means extends essentially in the vehicle transverse direction as viewed in plan view.

18. An independent wheel suspension according to claim 17, characterized in that the point of pivotal connection of the coupler means at the wheel carrier means is located to the rear of the vehicle cross plane containing the wheel center in relation to the vehicle longitudinal direction.

19. An independent wheel suspension according to claim 18, characterized in that the rod means is pivotally connected at said coupler means near the point of pivotal connection of the coupler means on the side of the wheel carrier means.

20. An independent wheel suspension according to claim 17, characterized in that the rod means together with the coupler means form the upper guide means.

21. An independent wheel suspension according to claim 17, characterized in that the rod means is formed as a tension rod and has an extension directed toward the rear in relation to the vehicle longitudinal direction.

22. An independent wheel suspension according to claim 21, characterized in that the rod means extends in plan view approximately perpendicularly to the pivot axis of the first guide means.

23. An independent wheel suspension according to claim 22, characterized in that the spring means is supported on the first guide means adjacent the point of pivotal connection thereon of the coupler means.

24. An independent wheel suspension according to claim 23, characterized in that in relation to a plan view, a spring seat means coordinated to the one guide means is located essentially between the point of pivotal connection of the coupler means at the first guide means and the point of pivotal connection on the side of the body of the rod means.

25. An independent wheel suspension according to claim 24, characterized in that the point of pivotal connection of the wheel carrier means at the first guide means has about the same distance from the pivot axis thereof as the spring seat means.

26. An independent wheel suspension according to claim 25, characterized in that within the area of the spring seat means, an arm of a stabilizer is pivotally connected at the guide means.

27. An independent wheel suspension according to claim 26, characterized in that the stabilizer which is at least approximately U-shaped in plan view, is located in front of the guide means in relation to the vehicle longitudinal direction.

28. An independent wheel suspension according to claim 27, characterized in that the common pivot axis of the wheel carrier means and of the coupler means extends with respect to the first guide means carrying the point of pivotal connection of the coupler means approximately parallel to the pivot axis thereof as viewed in plan view.

29. An independent wheel suspension according to claim 28, characterized in that said first guide means is the lower wheel guide member and the second guide means is the upper wheel guide member.

30. An independent wheel suspension according to claim 29, characterized in that the coupler means is pivotally connected at the wheel carrier means.

31. An independent wheel suspension according to claim 29, characterized in that the rod means is pivotally connected at the wheel carrier means.

32. An independent wheel suspension according to claim 31, characterized in that the coupler means is pivotally connected at the rod means.

33. An independent wheel suspension according to claim 29, characterized in that the rod means is pivotally connected at the coupler means.

34. An independent wheel suspension according to claim 7, characterized in that said first guide means is constructed as a triangular guide member.

35. An independent wheel suspension according to claim 34, characterized in that the triangular guide member is constructed as an oblique guide member.

36. An independent wheel suspension according to claim 34, characterized in that the outer point of pivotal connection on the side of the body of the triangular guide member is located approximately in the wheel longitudinal center plane.

37. An independent wheel suspension according to claim 36, characterized in that the inner point of pivotal connection on the side of the body of the triangular guide member is located within the area of the vehicle longitudinal center plane.

38. An independent wheel suspension according to claim 34, characterized in that the point of pivotal connection of the coupler means at the triangular guide member is located outside of the triangle delimited in plan view by the points of pivotal connection thereof.

39. An independent wheel suspension according to claim 34, with a spring means, characterized in that the support of the spring means at the triangular guide member is located in plan view outside of the triangle delimited by the points of pivotal connection thereof.

40. An independent wheel suspension according to claim 7, characterized in that the point of pivotal connection of the coupler means at the first guide means is located in front of the cross plane containing the wheel center in relation to the vehicle longitudinal direction.

41. An independent wheel suspension according to claim 7, characterized in that the rod means is pivotally connected at said coupler means near the point of pivotal connection of the coupler means on the side of the wheel carrier means.

42. An independent wheel suspension according to claim 7, characterized in that a spring means is supported on the first guide means adjacent the point of pivotal connection thereon of the coupler means.

43. An independent wheel suspension according to claim 7, characterized in that in relation to a plan view, a spring seat means coordinated to the first guide means is located essentially between the point of pivotal connection of the coupler means at the first guide means and the point of pivotal connection on the side of the body of the rod means.

44. An independent wheel suspension according to claim 43, characterized in that the point of pivotal connection of the wheel carrier means at the first guide means has about the same distance from the pivot axis thereof as the spring seat means.

45. An independent wheel suspension according to claim 43, characterized in that within the area of the spring seat means, an arm of a stabilizer is pivotally connected at the guide means.

46. An independent wheel suspension according to claim 45, characterized in that the stabilizer which is at least approximately U-shaped in plan view, is located in front of the guide means in relation to the vehicle longitudinal direction.

47. An independent wheel suspension according to claim 7, characterized in that said first guide means is the lower wheel guide member and the other guide means is the upper wheel guide member.

48. An independent wheel suspension according to claim 1, characterized in that the coupler means extends essentially in the vehicle transverse direction as viewed in plan view.

49. An independent wheel suspension according to claim 1, characterized in that the point of pivotal connection of the coupler means at the wheel carrier means is located to the rear of the vehicle cross plane containing the wheel center in relation to the vehicle longitudinal direction.

50. An independent wheel suspension according to claim 1, characterized in that the rod means together with the coupler means form an upper guide means.

51. An independent wheel suspension according to claim 1, characterized in that the rod means as tension rod has an extension directed toward the rear in relation to the vehicle longitudinal direction.

52. An independent wheel suspension according to claim 1, characterized in that the rod means extends in plan view approximately perpendicularly to the pivot axis of the first guide means.

53. An independent wheel suspension according to claim 1, characterized in that the common pivot axis of the wheel carrier means and of the coupler means extends with respect to the first guide means approximately parallel to the pivot axis thereof as viewed in plan view.

* * * * *